United States Patent

[11] 3,548,874

| [72] | Inventor | Asbury S. Parks |
| | | Houston, Tex. |
| [21] | Appl. No. | 716,644 |
| [22] | Filed | Mar. 27, 1968 |
| [45] | Patented | Dec. 22, 1970 |
| [73] | Assignee | Dover Corporation, W. C. Norris Division |
| | | Tulsa, Okla. |
| | | a corporation of Delaware |

[54] SEALING STRUCTURE
14 Claims, 6 Drawing Figs.

[52] U.S. Cl. .................................................. 137/625.5,
251/362; 287/52.06
[51] Int. Cl. ................................................................ F16k 11/04
[50] Field of Search .......................................... 137/625.5;
251/315, 174, 362, 363; 287/52.06, 52.04

[56] References Cited
UNITED STATES PATENTS

| 2,590,702 | 3/1952 | Holmes et al. | 251/363X |
| 2,845,085 | 7/1958 | Robbins | 251/363X |
| 3,042,363 | 7/1962 | Deeks | 251/362 |
| 3,063,469 | 11/1962 | Freeman | 137/625.5X |
| 3,354,911 | 11/1967 | Fall | 251/363X |
| 3,387,815 | 6/1968 | Richards | 251/315X |

Primary Examiner—M. Cary Nelson
Assistant Examiner—Michael O. Sturm
Attorneys—J. Vincent Martin, Joe E. Edwards and Jack R. Springgate ABSTRACT: This specification discloses a sealing structure having application to sealing, such as, removable valve seats in a valve, with a metal-to-metal seal which is resiliently loaded to maintain the seal when the structure containing the seal is distorted by wide variations in temperature, pressure and mechanical stress conditions to which the seal is exposed. This abstract is neither intended to define the invention of the application which, of course, is measured by the claims, nor is it intended to be limiting as to the scope of the invention in any way.

Asbury S. Parks
INVENTOR

PATENTED DEC 22 1970

Asbury S. Parks
INVENTOR

BY J. Vincent Martin
Joe E. Edwards
Jack C. Springate
ATTORNEYS

3,548,874

SEALING STRUCTURE

BACKGROUND OF THE INVENTION

The present invention relates to a sealing structure which is readily installed and set into sealing engagement and includes a novel sleeve which is utilized to maintain the seal in sealing position while permitting passage of fluids through the sleeve.

Prior to the present invention, wedging type seals have been used along with other types of seals such as, flat gaskets, to effect a pressure seal but these prior seals have been subject to certain problems. First, such seals have been difficult to install and remove and second, the sealing engagement of such seals has been difficult to maintain particularly where the seal structure undergoes distortion due to mechanical stress or uneven thermal expansion of the parts of the seal containing assembly when subjected to sudden changes in temperature, pressure and mechanical stress. In valves where removable seats have been commonly used, the foregoing problems are encountered. In an attempt to overcome these problems, some valve seats have been secured within the valve body as by welding, but this renders removal and replacement of the valve seat difficult. A particular difficulty encountered with the maintenance of seals in high pressure valves, is the limited degree of resiliency of the sealing member. In metal-to-metal sealing devices, such as are commonly used in high pressure valves, there is only a very limited elastic yielding of the parts of the seal structure and therefore any dimensional changes in the structure due to variations in pressure, temperature or mechanical stresses results in a seal failure.

It is noted that one company manufacturing valves suggests the use of removable valve seats which are threaded into the body but further recommends that the valve seat be welded in position to prevent leakage if the valve is to be subject to such variations.

A further difficulty encountered in prior valves has been that their sealing structures require a shoulder or stepped structure and sealing is accomplished by flat gaskets. Such valves require very accurate machining for proper initial sealing and the flat gaskets are deformed by distortions so that they no longer provide a proper seal.

SUMMARY

The present invention provides a sealing structure which, when properly set, maintains a pressuretight seal under wide variations in temperature, pressure and mechanical stresses and when relaxed, is readily removable. Additionally, the present invention provides an improved structure for maintaining a loading force on the sealing structure so that the metal-to-metal seal provided thereby is maintained pressuretight under such wide variation in conditions. Further, the sealing structure of the present invention has application to valves wherein the valve seat is truly removable and readily replaceable but when installed and loaded, maintains its pressuretight seal under wide variations in such conditions. The present invention also makes possible the use of multiple seals of the same type where required in a single device such as, a valve with all seals having the foregoing advantages of pressuretight sealing and ease of removal.

An object of the present invention is to provide an improved pressure sealing device which maintains a metal-to-metal pressure seal even though exposed to wide variations in temperature, pressure and mechanical stresses.

Another object is to provide an improved sealing structure which is easily installed within and removed from the position within the particular device in which it is used.

Another object is to provide a sealing structure including a seal ring which is adapted to be wedged outwardly into sealing engagement and wherein the loading force is transmitted uniformly around an annular surface of the seal ring to assure complete sealing engagement of the seal ring.

Still another object is to provide an improved valve having a removable valve seat which is sealed within the valve body with a resiliently loaded metal-to-metal seal, whereby the seal between seat and body is maintained under wide variations in temperature, pressure and mechanical stress conditions.

A still further object is to provide an improved seat sealing structure of the character described, for use in a valve which maintains the seat seal under varying conditions of pressure, temperature and mechanical stress without obstructing flow through the valve.

Another object is to provide an improved valve having multiple sealing elements which are all set by a single loading force and the sealing engagement of each element is maintained even though the valve is subjected to dimensional changes due to changes in pressure, temperature or mechanical stress conditions.

A still further object is to provide a resilient valve plug for a valve having the sealing structures for the valve seat ring which plug uniformly engages the seat ring even when the seat ring has been distorted.

These and other objects and advantages of the present invention are hereinafter described and explained.

DESCRIPTION OF THE PREFERRED EMBODIMENT

The sealing structure of the present invention includes a metal seal ring having a preselected size so that it is readily installed in the structure it is to seal, a metal wedging means or ring and a means for axially loading the wedging means and the seal ring uniformly around the surface of the seal ring so that the seal ring is uniformly deformed into sealing position. Additionally, the sealing structure includes a resilient means which maintains the axial loading force on the seal ring and the wedging means to maintain the sealing structure in sealing engagement even when exposed to distortion due to variations in temperature, pressure and mechanical stresses. The sealing structure of the present invention may be used to seal against a bore or a shaft.

Figures 1, 1A, 1B:
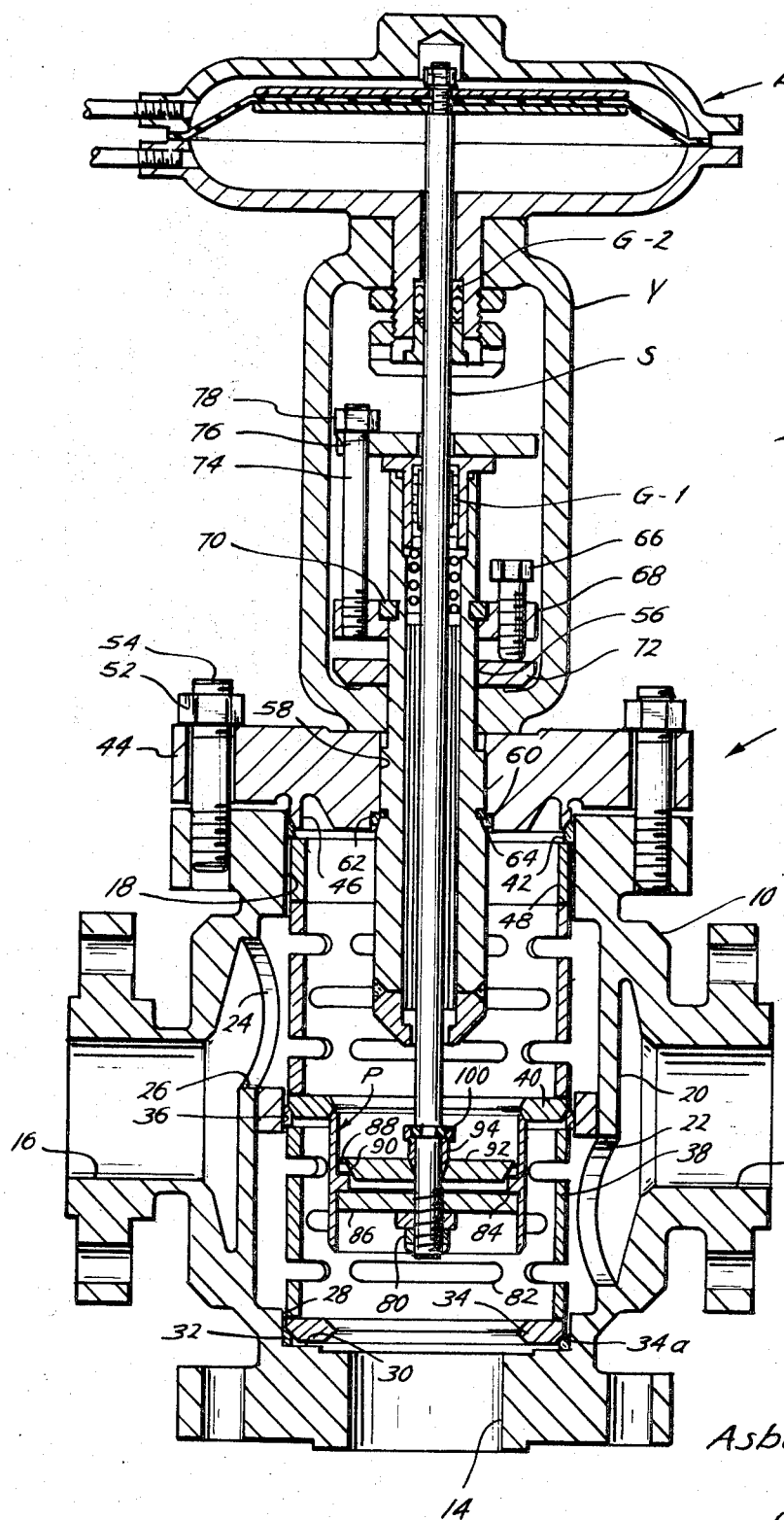
FIG. 1 is a sectional view of a valve constructed to include several forms of the sealing structure of the present invention.
FIG. 1A is a typical partial detail sectional enlargement of the sealing action of the seal for the second or upper seat ring.
FIG. 1B is another typical partial sectional enlargement illustrating the sealing structure shown in FIG. 1A in unloaded condition.

The valve V shown in FIG. 1 illustrates a structure in which several sealing structures of the present invention are used. The resilient load maintaining means in addition to preserving the loading force to maintain the sealing engagement of the seal rings also provides a flow path through which fluids flow.

The body 10 of valve V defines the inlet 12, the outlets 14 and 16 and the top opening 18. The sleeve 20 is an integral part of the body 10 and defines ports 22 and 24. Sleeve 20 may be integral as shown or otherwise suitably installed therein so that flow from the inlet 12 must pass through the port 22 into the bore of sleeve 20 and flow to outlet 16 must pass through the port 24. Thus, sleeve 20 fixes the flow path of fluids through valve V so that such flow may be directed to one of the outlets and cannot flow around the sleeve 20 directly to the outlet 16. Sleeve 20 provides a flow path which may be controlled by a valve member in cooperation with suitable valve seats as hereinafter described.

The ring 26 is secured within sleeve 20 at a position above port 22 and below port 24 to provide for the positioning of the valve seat through which fluids flow to flow through outlet 16. The body 10 immediately within outlet 14 defines the bore 28 and the upwardly facing shoulder 30 to provide for the positioning of the valve seat through which fluids flow to flow through outlet 14.

Seal ring 32 which has a free outside diameter less than the diameter of bore 28 is positioned therein supported on shoulder 30. Seat ring 34, which has an outer frustoconical surface 34a, wedges seal ring 32 outwardly into sealing engagement with the bore 28 when loaded. Also, seat ring 34 defined the lower or first valve seat. Seal ring 36 is supported on slotted sleeve 38 and is wedged outwardly by seat ring 40 into sealing engagement with the inner surface 26a of ring 26. Seat ring 40 defines the upper or second valve seat. The slotted sleeve 38 which is positioned within the sleeve 20 engages the upper surface of seat ring 34 and supports seal ring 36 within ring 26. The seal ring 42 is positioned within the opening 18 and is adapted to provide a seal for the closure 44. The seal ring 42 is wedged outwardly into sealing engagement with the bore of opening 18 by the annular yieldable projection 46 on closure 44. Seal ring 42 is supported within opening 18 by spacer sleeve 48 and slotted sleeve 50. Slotted sleeve 50 engages the upper surface of seat ring 40 within ring 26 and engages spacer sleeve 48 within the bore of opening 18. These three sealing structures are loaded by the downward force on closure 44 from the tightening of nuts 52 on studs 54.

The sealing engagement of the individual seal rings is best understood by reference to FIGS. 1A and 1B wherein an enlarged partial sectional view of seal ring 36 is shown. The relaxed position of seal ring 36 within ring 26 is shown in FIG. 1B. The outer surface 36a of seal ring 36 is spaced from the inner surface 26a of ring 26. The lower outer surface 40a of seat ring 40 is frustoconical, tapering upwardly and outwardly. With the tapered surface 40a engaging seal ring 36, an axial loading of the structure causes seat ring 40 to wedge seal ring 36 radially outward so that its surface 36a seals against the inner surface 26a of ring 26. This axial loading causes each of the seal rings 32, 36 and 42 to be wedged into sealing engagement with the respective bores in which they are positioned. The axial loading is transmitted between sealing structures by the spacer sleeve 48, and the slotted sleeves 50 and 38. This loading is transmitted to each sealing structure and because of the use of the sleeve structures, is uniformly exerted around the annular area of engagement to assure that each sealing ring is wedged outwardly into sealing engagement.

The slotted sleeves 38 and 50 are resilient by reason of their slotted structure. Thus, the axial loading of the slotted sleeves 38 and 50 compresses the sleeves so that they perform the function of the previously described resilient means of maintaining sufficient loading on the sealing structures to assure continued sealing when the structures are subjected to variations in temperature, pressure and mechanical stresses.

As hereinafter explained, when the sealing structures of valve V are unloaded as by removal of closure 44, the seal rings contract and are readily removed from the valve body 10. This contraction is possible because the wedging of the seal rings is adapted to produce an elastic deformation of the seal rings and because the angle on seat rings 34 and 40 and closure 44 is greater than the sticking angle for the materials used in the seal rings and the seat rings and closure. Thus, when the axial force is relaxed, the seal rings can contract by sliding toward the small end of the tapered surfaces. The sealing structures shown and described are all loaded by a single loading force and each individual sealing structure is uniformly loaded so that each seal ring is uniformly wedged outwardly into sealing engagement with the bore in which it is positioned.

The valve plug P is secured to the valve stem S and is positioned between the lower and upper seat rings 34 and 40 and adapted to seat in its lower position against the seat ring 34 to close flow between inlet 12 and outlet 14 and allow flow between inlet 12 and outlet 16 and in its upper position, to seat against the upper seat ring 40 to close flow between inlet 12 and outlet 16 an allow flow between inlet 12 and outlet 14. Movement of the valve stem S and plug P is accomplished by the actuator A which is secured to the upper end of the valve stem S and supported from the top closure plate 44 by the yoke Y. Suitable packing is provided around the valve stem S by the packing glands G-1 and G-2; the packing gland G-1 adapted to maintain a seal around the valve stem S to prevent pressure leakage therearound from within the valve body 10 and the packing gland G-2 adapted to seal around the valve stem S to prevent leakage of pressure therearound from the actuator A. Support for the yoke Y and actuator A from the top closure 44 is provided by the packing tube 56 which extends through the central bore 58 in top closure 44 and is sealed to the underside thereof by the seal ring 60 which is adapted to be wedged between the shoulder 62 defined by the top closure 44 and the tapered surface 64 on the exterior of packing tube 56. Upward force on packing tube 56 is exerted by the bolts 66 which act as jacks to lift the plate 68 which is connected to the packing tube 56 by the split ring 70 positioned in a groove on the exterior of the packing tube 56. Thus, as the bolts 66 are rotated in a direction to thread downwardly into the plate 68, abutment with the plate 72 supported on the yoke base causes the plate 68 to be lifted and thereby exerts an upward force on the packing tube 56. This force is exerted on seal ring 60 by the surface 64 to wedge seal ring 60 into sealing engagement with the bore 58 in closure 44.

The plate 68 also functions to provide for the tightening of the packing gland G-1 by the connection of the studs 74 into the plate 68 and such studs extend upwardly through the plate 76. Tightening of the nuts 78 above the plate 76 forces the plate 76 downwardly to tighten the packing gland G-1. While only one each of the bolts 66 and the studs 74 are shown, it is to be understood that there will normally be at least three of each spaced around the packing tube 56 so that uniform forces are exerted on the plates 68 and 76.

Figure 2:
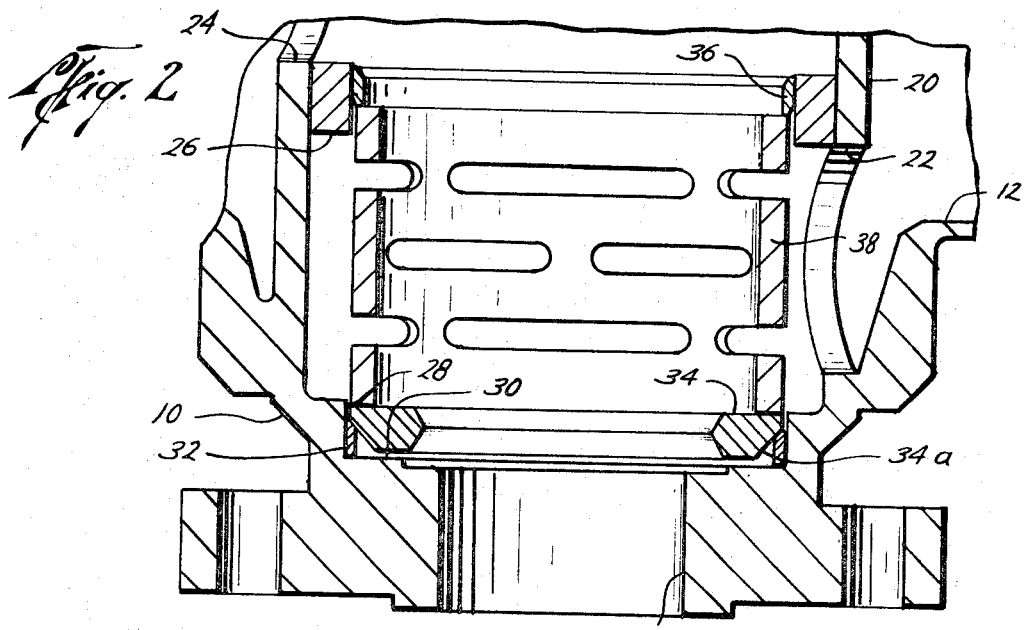
FIG. 2 is an enlarged sectional view illustrating the installation of the first seat ring and its accompanying seal ring, the resilient loading cylinder and the second seal ring.
Figure 3:
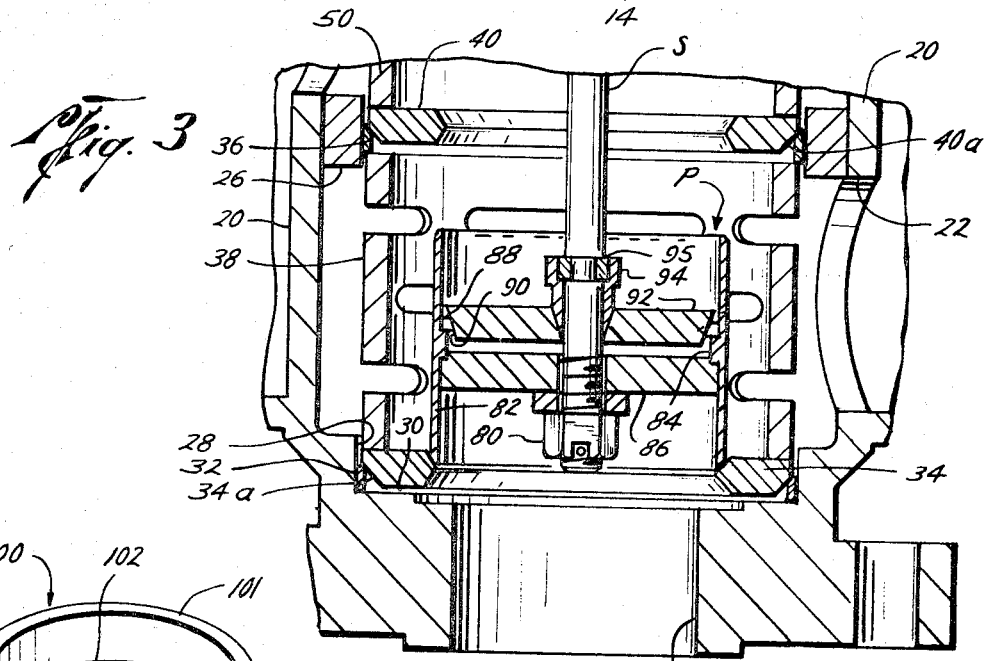
FIG. 3 is a detail sectional view of the valve plug and its attachment to the lower end of the valve stem.

In installing these structures within the valve body 10, the lower sealing ring 32 is first placed within the bore 28 on the shoulder 30, thereafter the lower seat ring 34 is installed with the slotted sleeve 38 thereon. The slotted sleeve 38, when properly installed, has its lower edge within the bore 28 and its upper edge within the bore of ring 26 so that proper alignment of slotted sleeve 38 is as shown in FIG. 2. With slotted sleeve 38 in place, the sealing ring 36 is placed within the ring 26 supported on the sleeve 38. In this position, the valve plug P and valve stem S are inserted as shown in FIG. 3. With the valve plug in position, the upper seat ring 40 may be installed together with the upper slotted sleeve 50, the spacer 48 and the seal ring 42. Thereafter, the closure 44 with the packing tube 56 installed therein is slipped over the stem S and secured to the valve body 10 by the studs 54 and nuts 52. Tightening of the nuts 52 provides axial loading for each of the sealing structures sufficient to move seal rings 32, 36 and 42 into their sealing position. This loading also elastically deforms the slotted sleeves 38 and 50 to an extent that they maintain the sealing position of the sealing structures during all conditions of temperature, pressure and mechanical stress occurring within the valve. With the packing glands G-1 and G-2, properly installed and loaded, and the actuator A secured to the top of the stem S, the valve is ready for service. As shown in FIG. 1, the inlet 12 and the two outlets 14 and 16 are provided with suitable means for connecting the valve into flow lines. The connecting means shown are the flanges surrounding inlet 12 and outlets 14 and 16.

The valve plug P is secured to the valve stem S by the nut 80 which is threaded onto the lower end of the valve stem S. The valve plug P includes the sleeve 82, which includes an inwardly projecting rib 84 against which the lower plate 86 and the seal ring 88 abut. Seal ring 88 is tapered and adapted to cooperate with the external tapered surface 90 on the upper plate 92 and the interior of sleeve 82 to provide a seal therebetween. The interior of the upper plate 92 is tapered to receive the tapered bushing or seal ring 94 which is secured to the valve stem S by the snap ring 96 positioned in a groove in the valve stem S. Thus, when the nut 80 is tightened, the seal ring 88 is wedged outwardly into sealing engagement with the interior of the valve sleeve 82 and the tapered bushing 94 is wedged into sealing engagement between the exterior of the valve stem S and the interior of the upper plate 92. Sleeve 82 is suitably formed at its ends for seating on seat rings 34 and 40.

As the nut 80 is tightened on stem S, plates 86 and 92 are elastically deformed, being supported at their edges and loaded in the center. This elastic deformation of plates 86 and 92 holds tapered bushing 94 and seal ring 88 in tight sealing engagement throughout a wide range of differential expansion and movement of components resulting from variations in temperatures, pressure and mechanical stresses. Thus, plates 86 and 92 perform the function of the aforementioned resilient means for maintaining sufficient loading force on the sealing structures to assure that sealing engagement is maintained. The sealing structure providing the seal between stem S and the interior of plate 92 illustrates the sealing structure of the present invention adapted to seal around the exterior of the shaft. The sealing structures in plug P prevent the flow of fluids through the the interior of sleeve 82.

In the loading of the sealing structure of the present invention, it is important that sufficient loading force be applied to distort the sealing rings into the desired metal-to-metal sealing contact with their respective cylindrical bores. The force necessary for this is a function of the cross-sectional area of the ring, the physical properties of the ring and the degree of taper on the member being forced into the ring. It is also preferable in such loading that the design of the components be such that the sealing ring is expanded into tight sealing engagement with the cylindrical bore before the resilient means maintaining the loading, i.e., the slotted sleeves 38 and 50 are compressed to their elastic limit. Also, consideration must be given to the temperature to which such means (sleeves 38 and 50) are to be exposed. For example, if the sleeves 38 and 50 are to be exposed to maximum operating temperatures, they are rapidly heated while the body, because of its mass, heats more slowly therefore provision should be made for the differential expansion of the sleeves with respect to the valve body 10 which creates additional compressive force on the sleeves and if this force exceeds the elastic limit of the material, a permanent deformation of the slotted sleeves occurs. Thus, it is preferred that the design of the overall assembly be such that the sum of the force in the sleeves required to expand and seal the seal rings and the force generated in the sleeves due to the confinement preventing movement due to thermal expansion, does not exceed the elastic limit of the material of such sleeves. Also, the initial loading must be sufficient to maintain a force sufficient to assure proper sealing when the sleeves are cooled and thereby contract responsive to such cooling. This enables the assembly of sealing structures to be subjected to heating and cooling cycles and changes in pressures and mechanical stresses which tend to create differential motion between the components of the assembly while at the same time maintaining sufficient force on the sealing structures to maintain the sealing rings in sealing engagement.

One important advantage of the sealing structure of the present invention is the ease with which it may be disassembled and removed. For example, when the load is removed from the sealing structure, the tapered surfaces are withdrawn from the sealing rings thus permitting the shrinking of the sealing rings from sealing engagement with the walls of the bores in the body. This shrinkage is dependent upon the original dimensions of the sealing rings and bores and upon the elastic limit of the sealing ring material in tension.

Assuming the sealing rings are made of steel which material has a modulus of elasticity permitting it to stretch approximately one one-thousandth of its length when the stress is 30,000 pounds per square inch and that this steel material also had such physical characteristics that its elastic limit were 30,000 pounds per square inch, it could be stretched one one-thousandth of its length before permanent set or plastic deformation occurred. Actually most steels can be stretched by exceeding their elastic limit to a reasonable degree and then they spring back an amount approximately equal to their elastic deformation (one one-thousandth of its length is the above example) when the force is released.

Thus, the sealing ring may be fabricated from such a steel to have an outside diameter smaller than the bore in which it is to seal by one-thousandth of its diameter and still return to its original size upon release of the expansion or deformation loading. For example, if the bore to be sealed is 8 inches in diameter, the sealing ring could be made with an outside diameter of 7.992 and the clearance exists whenever the sealing ring is unloaded both before and after expansion of the ring into sealing engagement with the bore. In actual practice, the sealing ring could be made slightly smaller so that it would be plastically deformed when expanded into sealing engagement and upon release of the loading force, the outer diameter of the sealing ring would contract to approximately 7.992 inches and could thus be easily lifted from the bore. The physical characteristics of the material from which the sealing rings are made affect the spring back of the sealing ring after it has been in sealing engagement but this spring back enables the sealing ring to readily be removed once the loading force has been relieved.

It is suggested that the degree of taper on the frustoconical surface of the seat ring be controlled to allow sufficient force to deform the sealing ring into its sealing position with normal loading force and to assure that a binding between the sealing ring and the tapered surface of the seat ring which might prevent the withdrawal of the seat ring does not occur. Such degree of taper is determined in relation to the coefficient of friction for the materials of the seat ring and the seal ring. With materials having a relatively low coefficient of friction, the degree of taper may be less than if the materials have a relatively high coefficient of friction.

Figure 4:
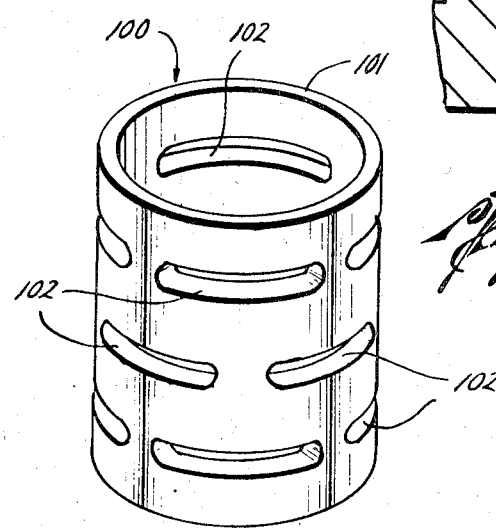
FIG. 4 is a perspective view of the resilient slotted loading cylinder.

As clearly shown in FIG. 4, the resilient means or slotted sleeve 100 includes the tubular body or sleeve 101 which defines a plurality of spaced apart, staggered slots 102 extending therethrough. The resilient means may be of some other suitable resilient annular or tubular design which exerts a force when compressed. The flow area provided by the slots 102 should be sufficient so as not to unduly restrict the flow of fluids therethrough. The slots 102 at each level of the cylinder L are staggered so that each portion of the cylinder acts as a beam which elastically deflects when loaded. The rate of deflection or deformation relative to the applied load is determined by the thickness of the material in the sleeve, the widths of the slots and solid parts, the length of slots and the modulus of elasticity of the material. In those valves in which the sealing structure is not subjected to distortions caused by wide variations in temperature, pressure or mechanical stresses, the means transmitting the loading to the sealing structure may be a nonresilient tubular means. In such valves, the seal structure of the present invention still avoids the use of shoulders or stepped bores and the use of flat gaskets.

As previously stated, the resilient means is designed to maintain adequate loading for the sealing structures of the present invention and also preferably to avoid permanent set or plastic deformation when exposed to extremes of temperature, pressure and mechanical stresses. In this manner, the extreme changes in temperatures, while changing the stress buildup in the sleeve, do not cause the sleeve to take a permanent set which might allow the sleeve to unload the sealing structure when conditions again change.

From the foregoing it can be seen that the present invention provides an improved sealing structure, particularly adapted for sealing removable valve seats within a valve, allows the valve seat and sealing structure to be readily replaceable after use and maintains a loading sufficient to provide a positive metal-to-metal seal under varying conditions of temperature, pressure and mechanical stress.

This structure is also particularly applicable to installations where multiple sealing structures may be used with a single loading force and are maintained in sealing position by the slotted sleeves. Further, the transmission of the axial load to the annular seal ring by the resilient sleeve assures that the seal ring is uniformly loaded and uniformly deformed into complete sealing engagement.

The radial expansion of the seal ring permits a valve to be constructed with all bores to be sealed having the same size. This permits the use of standard sized seal rings and seat rings. Prior metal-to-metal sealing structures have required some type of face-to-face structure such as stepped bores to accommodate multiple sealing structures. In such a structure the spacer sleeves must have a very exact length to even approach uniform compression of the seals. Difficulties are still encountered in such sealing structures when subjected to uneven thermal expansion because the seals can be permanently crushed. Another advantage of the sealing structure of the present invention is that the seat rings are small in cross-sectional area in relation to their diameter allowing both the seat ring and the seal ring to distort with the distortions in the heavy body in which they are positioned to thereby maintain the seal. In the valve illustrated, the valve plug is a thin walled tubular member which will distort to fit any distortions of the seat rings.

The foregoing disclosure and description of the invention are illustrative and explanatory thereof, and various changes in the size, shape and materials, as well in the details of the illustrated construction, may be made within the scope of the appended claims without departing from the spirit of the invention.

I claim:

1. A structure for sealing against a cylindrical surface comprising:
   a metal wedging ring positioned in close spaced relationship to said cylindrical surface and having a frustoconical surface tapering with respect to said cylindrical surface;
   a metal seal ring adapted to be positioned between said frustoconical surface of said wedging ring and said cylindrical surface;
   said seal ring in relaxed position being spaced slightly from said cylindrical surface; and
   loading means forcing said seal ring uniformly against said frustoconical surface whereby said seal ring is elastically deformed into sealing engagement between said cylindrical surface and said frustoconical surface of said wedging ring, whereby when the force of said loading means is removed said seal ring springs back to a relaxed position spaced slightly from said cylindrical surface.

2. A sealing structure according to claim 1 including resilient means being elastically deformed by the loading force to maintain the wedging engagement between said wedging ring and said seal ring and assure sealing engagement of said seal ring with said cylindrical surface under varying conditions of temperature, pressure and mechanical stress.

3. A sealing structure according to claim 2 wherein said resilient means includes a slotted sleeve adapted to engage one of said seal rings and said wedging ring.

4. A structure according to claim 3 wherein said slotted sleeve includes:
   a tubular body having a plurality of spaced apart, transverse slots extending therethrough; and
   said slots being staggered with respect to each other whereby when said body is subjected to axial loading it deforms elastically in an axial direction.

5. A sealing structure according to claim 1 wherein said wedging ring comprises:
   an annular plate having inner and outer peripheries; and
   one of said peripheries defining said frustoconical surface engaging said seal ring and the other of said peripheries being loaded by said loading means whereby said plate is elastically deformed by the force of said loading means to maintain the sealing engagement of said seal ring with said cylindrical surface under varying conditions of temperature, pressure and mechanical stress.

6. A valve comprising:
   a body defining an inlet, an outlet, a passageway therebetween and a cylindrical bore surrounding said passageway;
   a metal seat ring adapted to be supported within said cylindrical bore and having an external tapered surface;
   a metal seal ring positioned between the tapered surface of said seat ring and said bore;
   means for applying a load to urge said seal ring onto the tapered surface of said seat ring whereby it is elastically deformed into sealing engagement with said cylindrical bore and said tapered surface;
   resilient means for maintaining said seal ring in sealing engagement with said cylindrical bore;
   a valve stem slideable with respect to said body;
   a valve plug mounted on said valve stem and adapted to be moved therewith into and from engagement with said valve seat; and
   actuating means for moving said valve stem.

7. A valve according to claim 6 wherein said resilient means includes, a slotted sleeve adapted to engage one of said seal rings and said seat ring to provide an annular transmission of forces thereto to assure uniform loading to effect deformation of said seal ring into sealing engagement with said cylindrical bore.

8. In a sealing structure including a first member having a cylindrical surface, a wedging ring having a surface tapering with respect to said cylindrical surface, a seal ring adapted to be forced against said tapered surface and deformed thereby into sealing engagement with said cylindrical surface, and means applying an axial load, the improvement comprising:
   a tubular body exposed to the applied axial load and engaging one of said seal rings and said wedging ring;
   said tubular body having a plurality of spaced apart, transverse slots extending therethrough; and
   said slots being staggered with respect to each other whereby when said body is subjected to axial loading it is elastically deformed in an axial direction.

9. A valve, comprising:
   a body defining an inlet, a first outlet, a second outlet, passages communicating from said inlet to said outlets, a first cylindrical bore within said body surrounding the passage to said first outlet, a second cylindrical bore within said body surrounding said passage to said second outlet, said first and second cylindrical bores being in substantial axial alignment;
   a first valve seat ring defining an external tapered surface;
   a first valve seal ring adapted to engage said tapered surface of said first valve seat ring;
   a second valve seat ring defining an external tapered surface;
   a second valve seal ring adapted to engage said tapered surface of said second valve seat ring;
   said first seat ring and said first seal ring having outer diameters smaller than the diameter of said first bore;
   said second seat ring and said second seal ring having outer diameters smaller than the diameter of said second bore;
   a slotted sleeve engaging one of said first seat ring and first seal ring and also engaging one of said second seat ring and second seal ring;
   means urging said seal rings onto the tapered surfaces of their respective seat rings and elastically deforming said slotted sleeve whereby said seal rings are uniformly and elastically expanded by the wedging action of said tapered surfaces on said seat rings into sealing engagement between their respective seat rings and bores;
   a valve plug; and
   means for moving said valve plug between positions engaging each of said seat rings to direct flow from said inlet to a selected one of said outlets.

10. A sealing structure for sealing around the exterior of a cylindrical shaft, comprising:
   a seal ring;
   means defining a shoulder around said shaft;

an annular plate surrounding said shaft and having an inner frustoconical surface;

said seal ring being positioned between said shoulder on said shaft and said frustoconical surface; and means for applying a force to the outer periphery of said annular plate to urge said plate toward said seal ring whereby said seal ring is elastically deformed into sealing engagement between said frustoconical surface and the exterior surface of said shaft and said annular plate is elastically deformed to maintain a loading force on said seal ring.

11. A sealing structure according to claim 10 wherein the relaxed inner diameter of said seal ring is larger than the outer diameter of said shaft whereby said seal is readily installed around and removed from said shaft.

12. A sealing structure for a valve plug adapted to be mounted on a valve stem, comprising:

a sleeve defining an annular internal shoulder;

a first seal ring adapted to be positioned within said sleeve and abutting said shoulder;

means defining a shoulder surrounding said valve stem;

a second seal ring adapted to be positioned around said valve stem abutting said shoulder;

an annular plate defining an outer frustoconical surface adapted to engage said first seal ring and an inner frustoconical surface adapted to engage said second seal ring; and means for loading said plate with respect to said valve stem and said sleeve whereby said first seal ring is deformed into sealing engagement between said sleeve and said outer frustoconical surface and said second seal ring is deformed into sealing engagement between said valve stem and said inner frustoconical surface.

13. A valve, comprising:

a body defining an inlet, a first outlet, a second outlet, passages communicating from said inlet to said outlets, a first cylindrical bore within said body surrounding the passage to said first outlet, a second cylindrical bore within said body surrounding said passage to said second outlet, said first and second cylindrical bores being in substantial axial alignment;

a first valve seat ring defining an external tapered surface;

a first valve seal ring adapted to engage said tapered surface of said first valve seat ring;

a second valve seat ring defining an external tapered surface;

a second valve seal ring adapted to engage said tapered surface of said second valve seat ring;

said first seat ring and said first seal ring having outer diameters smaller than the diameter of said first bore;

said second seat ring and said second seal ring having outer diameters smaller than the diameter of said second bore;

a tubular ported spacer engaging one of said first seat ring and first seal ring and also engaging one of said second seat ring and second seal ring;

means urging said seal rings onto the tapered surfaces of their respective seat rings whereby said seal rings are elastically expanded by the wedging action of said tapered surfaces on said seat rings into sealing engagement between their respective seat rings and bores;

a valve plug; and means for moving said valve plug between positions engaging each of said seat rings to direct flow from said inlet to a selected one of said outlets.

14. A valve according to claim 9 wherein said valve plug includes a resilient sleeve adapted to engage said seat rings alternately and having sufficient resiliency to seat against said seat rings when said seat rings are distorted.